July 11, 1961  R. A. FRYKLUND  2,992,059
AUTOMATIC REMOTE RECORDERS
Filed Jan. 29, 1959  2 Sheets-Sheet 1

INVENTOR
ROBERT A. FRYKLUND
BY N. Vincent Harsha
ATTORNEY

July 11, 1961   R. A. FRYKLUND   2,992,059
AUTOMATIC REMOTE RECORDERS
Filed Jan. 29, 1959   2 Sheets-Sheet 2

INVENTOR
ROBERT A. FRYKLUND
BY N. Vincent Harsha
ATTORNEY

United States Patent Office 2,992,059
Patented July 11, 1961

2,992,059
AUTOMATIC REMOTE RECORDERS
Robert A. Fryklund, Dedham, Mass., assignor to Raytheon Company, a corporation of Delaware
Filed Jan. 29, 1959, Ser. No. 789,816
6 Claims. (Cl. 346—8)

This invention relates to apparatus for recording and displaying radar information and more particularly pertains to apparatus for transferring information from a plan position indicating cathode ray tube to a recording chart in a manner such that stationary targets are recorded in fixed positions and the sequential positions of moving targets are recorded as tracks drawn by moving objects so that the development of a situation is visually displayed and a history of the event occurring in the geographical area is preserved.

The most useful radar display presentation for navigational purposes is the plan position indicator, commonly termed PPI, which provides a representation of the surrounding locality in polar coordinates, that is, azimuth angle and range. There are, at present, two well-known types of plan position for ship navigation, viz., relative bearing presentation and true bearing presentation. In the relative bearing presentation, the equipped ship's position is represented by the center of the cathode ray tube and the ship's heading always appears at a zero reference angle on the tube's circumference, which is a fixed point at the top of the display tube. The azimuth angle of any object shown on the presentation is read relative to the ship's heading. This type of display is known as a standard relative bearing PPI presentation and is the type of display which is utilized in the invention.

In present marine radar display systems, regardless of whether a true-bearing or a relative-bearing presentation is employed, the observer can learn only two things by a single glance at the display, and those are the range and bearing of each object in the radar surveyed area. It is important to understand the fact that a single observation of the radar display yields but two items of information—bearing and range. It is only through the passage of time in which a series of observations is made that further information, such as the direction of motion and speed of an observed object, can be deduced. Moreover, neither of the two PPI presentations referred to above directly indicates whether an object is stationary or in motion. Because the center of the display tube represents the equipped ship and the ship is in motion, stationary objects appear to move across the face of the display tube and hence are indistinguishable from moving objects. A ship's officer would be better able to judge what action to take if he could immediately distinguish stationary from moving objects on the radar display and if he could quickly ascertain the speed and course of each moving object which may represent a hazard.

In the past difficulties have been encountered in ascertaining the true facts of marine disasters, as where two ships collide, due to the lack of any means for preserving a record of the initial disposition of the vessels and the subsequent maneuvers made by each. While the vessels in collision may be equipped with radar apparatus, the scenes displayed on the radar indicators are ephemeral and it is highly desirable to transcribe the radar displays on some sort of permanent record which will be available after the event has occurred.

The invention here disclosed is intended to enhance the utility of a ship's radar by transferring information from a PPI relative bearing presentation to a recording chart in such manner as to assist the ship's officer or other observer on the equipped ship to (1) directly determine from the chart whether an object is stationary or in motion, (2) permit the observer to quickly estimate or actually measure course and speed of objects of interest and, based on past maneuvers whether an object in motion is changing or is likely to change course or speed, and (3) present a picture so that collision courses can be determined without the necessity of making mental calculations.

The invention resides in apparatus which scans the face of a plan position indicating (PPI) cathode ray tube having the standard relative presentation and transcribes the information derived therefrom on a chart driven at a rate related to the speed of the ship carrying the radar system. The face of the PPI tube is scanned by an optical system closely following the trace of the beam and the intensity of light impinging on the optical system is converted into electrical signals which are amplified and impressed upon a stylus rotating synchronously with the optical system. The optical system is swept across the face of the PPI tube with high velocity while the system is carried around the periphery of the PPI tube in synchronism with the rotation of the radar antenna. Whenever an electrical signal is impressed on the stylus a mark is made upon the chart, the chart being a paper sensitive to electrical currents.

The invention, together with its organization, construction, and mode of operation, will be better understood by a perusal of the following description when considered in conjunction with the drawing wherein.

Figure 1:
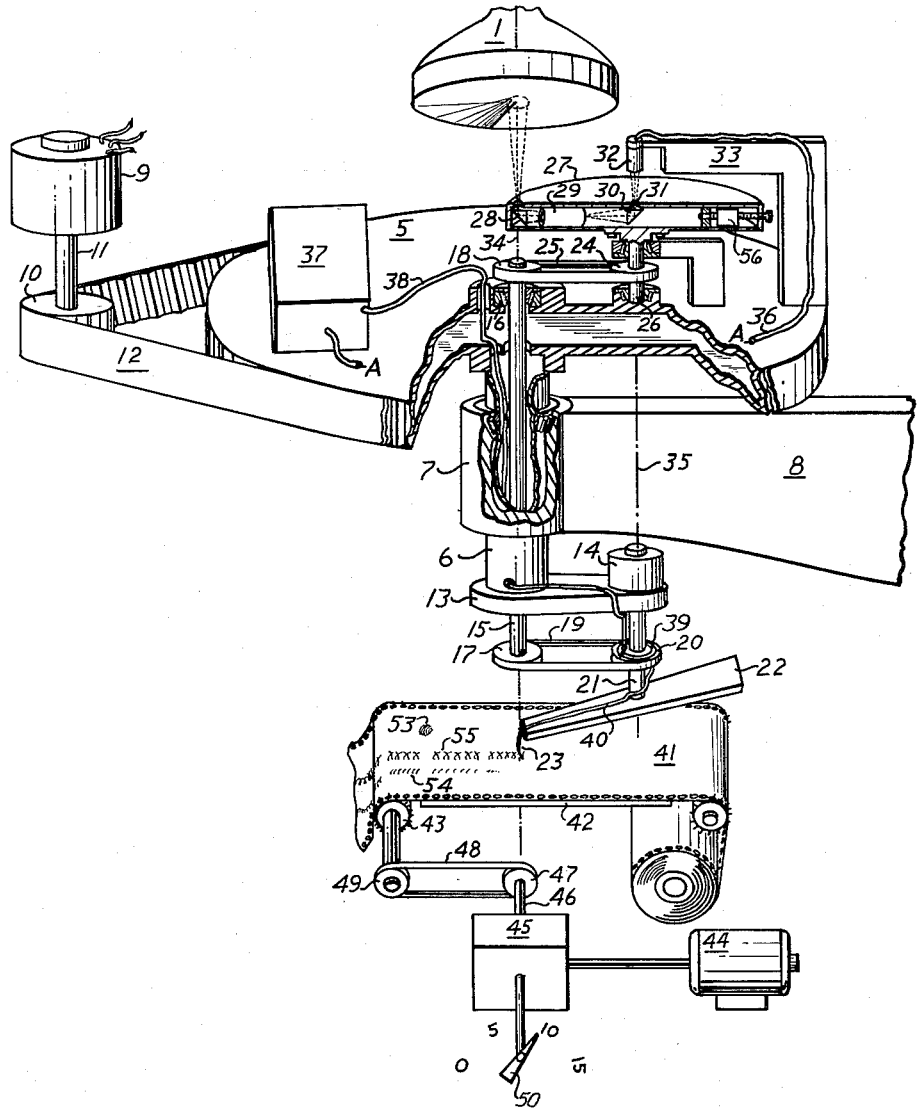
FIG. 1 illustrates the preferred embodiment of the invention.
Figure 2:
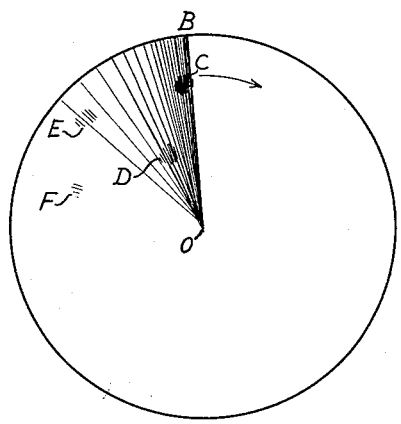
FIG. 2 depicts targets as they would appear on the face of a medium persistence cathode ray tube.
Figure 3:
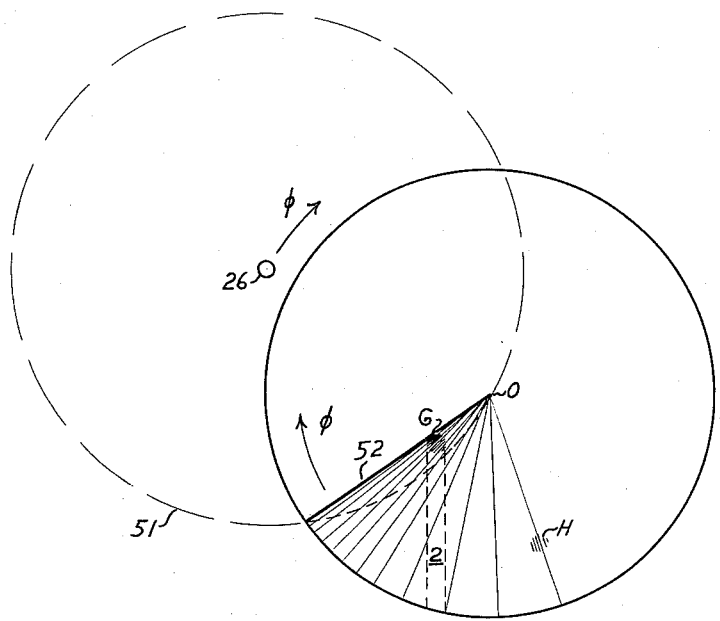
FIG. 3 depicts the manner in which the face of a cathode ray tube is scanned by an optical device.

Referring now to FIG. 1, there is shown a cathode ray tube 1, that tube being the indicator for a shipborne radar system having an antenna rotated in azimuth. Despite the radar system itself not being shown, it is to be understood that that system may be of any type, conventional or otherwise, which causes a relative bearing presentation to be displayed on a PPI cathode ray tube. For the purpose of illustrating the invention, it will be assumed that the radar system includes an antenna which makes a full revolution in azimuth at a constant rate of rotation. This assumption is not a necessary premise of the invention. The face of cathode ray tube 1 is preferably coated with phosphors having medium to short persistence when caused to fluoresce by an electron beam impinging thereon. As illustrated in FIG. 2 showing the face of cathode ray tube 1, the position of the ship is indicated by the center of the tube O, that center being also the origin of the scanning trace which moves radially toward the periphery of the tube. The light intensity at any point on the face of the tube varies with target information since the electron beam is modulated in accordance with radar echoes and excites the phosphors to varying degrees. The excited phosphors fluoresce, the fluorescence persisting for a time after the radial sweep of the beam has passed. Thus the line O—B (FIG. 2) represents the immediate path traced by the electron beam. The bright spot C represents a radar echo from a target now being scanned by the radar antenna; the spot D, of lesser brightness represents the radar echo from a target recently scanned by the antenna; the spot E, of considerably decreased brightness, represents the radar echo from a target less recently scanned; and the spot F, scarcely visible, represents the radar echo from a target scanned much less recently. If the ship were motionless and each of the targets C, D, E, F, were a stationary object, the spots would fluoresce brightly in turn as the radial sweep rotated about the face of the cathode ray tube and each spot in turn would fade completely before the trace again returned. Assuming now that the ship is moving on a steady heading, that a buoy is moored in the area, and that another vessel is following our ship on the same heading and at the same speed, the PPI presentation would be shown in FIG. 3 with our ship being represented at O, the buoy at G and the other vessel at H. As time progresses, our ship will leave the buoy far behind and therefore the spot G, each time it fluoresces, appears at a greater distance and drifts along the path 2 until it reaches the periphery of the tube 1 and is seen no more. The spot H, representing the other ship will, however, each time it fluoresces appear in the same location on the face of the tube because the range and bearing of the other ship relative to our ship has not changed. Insofar as this assumed situation is concerned, the invention shown in FIG. 1 takes the information from the face of the cathode ray tube (FIG. 3) and places it on a chart in a manner such that the buoy is shown at a stationary target and the other ship is shown as a moving object.

As indicated in FIG. 1, a circular table 5 is mounted on a shaft 6 journalled in a sleeve 7 supported by a bracket 8 secured to a support (not shown). The table is rotated in synchronism with the azimuth rotation of the radar antenna by the selsyn or servo motor 9 having a pulley 10, secured to the shaft 11, which drives a belt 12 engaging the periphery of table 5. Secured to the lower end of shaft 6 is a crank 13 carrying an electric motor 14. The crank 13 rotates synchronously with the table 5 since both are secured to the same shaft. A central shaft 15 extends through a bore in shaft 6 and is supported by thrust bearings 16 so that it rotates freely. Each end of central shaft 15 has secured to it a pulley 17, 18, the lower pulley 17 being engaged with a belt 19 driven by pulley 20 secured to the shaft 21 of motor 14. Also secured to shaft 21 is a recording arm 22 carrying a stylus 23. The upper pulley 18 drives a pulley 24 through a belt 25, the pulley 24 being secured to a shaft 26 journalled at its lower end in table 5 and carrying at its upper end a hollow drum 27 in which is disposed an optical system comprising a prism 28, a lens system 29, and a second prism 30. The upper surface of drum 27 is provided with a small circular aperture 31 so that light from prism 30 can be projected through the aperture onto the photoelectric device 32, such as a photocell or photomultiplier tube supported on an arm 33 secured to table 5. The various parts are so disposed that the axial center line 34 passes through the center of tube 1, prism 30, central shaft 15, and the tip of stylus 23. The longitudinal axis 35 of motor 14 passes through shaft 26, prism 30, and photoelectric device 32. The axis 35 is parallel to the axial center line 34 but displaced from it beyond the edge of the cathode ray tube 1. The electrical output from photoelectric device 32 is connected by conductor 36 to the input of an amplifier 37, the amplifier being secured to table 5. The output of amplifier 37 is impressed on the stylus 23 through a conductor 38 attached to a brush bearing on a slip ring 39 carried by shaft 21 and thence by conductor 40 connected between the slip ring and the stylus. The stylus is caused to sweep across a chart 41, the chart being drawn across a flat plate or platen 42 by a toothed drum 43 driven from a motor 44 through a multiplying mechanism 45 having a shaft 46 carrying a sheave 47 on which is engaged a belt 48, the belt in turn passing over a pulley 49 attached to the drum 43. The multiplying mechanism is provided with an indicating arm 50 that may be set to register with a dial having ship's speed indexing markings. In setting the indicating arm to ship's speed, the chart is driven at a related rate by changing the multiplying factor in the mechanism 45. Should the ship be equipped with apparatus for automatically determining ship's speed, the manual setting of ship's speed may be superseded by having the multiplying mechanism governed by that apparatus.

The prism 28 is caused to scan the tube's bright area directly behind the radial scan by causing the drum 27 to be rotated at high speed so that the prism 28 sweeps out a path of which the radial scan is a chord. Thus, in FIG. 3, the circle 51 represents a path of the prism 28, the inner concentric circle represents shaft 26, and the line 52 is the radial scan, the radial scan being a chord of the circle 51. Since the shaft 26 is mounted on circular table 5 and that table rotates in synchronism with the radar antenna, the shaft 26 will be carried around the periphery of tube 1 in the same rotary direction as the rotating radial sweep so that the radial sweep, no matter what its position, will always be a chord of the circle swept out by rotating prism 28. That is, if the rotating radial sweep turns in a clockwise direction, as indicated by the arrow in FIG. 3, through an angle $\phi$, the shaft 26 will concurrently turn in the same direction through the same angle $\phi$. Thus, as the radial sweep 52 rotates through a full circle, the prism 28 scans the entire surface of the tube. It is desirable to rotate the scanning prism 28 at the highest practical velocity in order to obtain high definition. Assuming that drum 27 carrying the optical system is operated at 1800 revolutions per minute (r.p.m.) (equal to 30 revolutions per second) and the antenna is rotated at 20 r.p.m., the following azimuth resolution is obtained:

$$20 \text{ r.p.m.} \times 30° = 7200°/\text{min.}$$

$$\frac{7200°/\text{min.}}{1800 \text{ r.p.m.}} = 4° \text{ of azimuth/scan}$$

If the drum 27 is rotated at 3600 r.p.m., the resolution obtained is 2° of azimuth/scan.

The prism 28, as it sweeps across the face of the cathode ray tube, receives light from the fluorescent phosphors and reflects that light into the lens system 29. The lens system focuses the image of the scanned portion of the cathode ray tube upon the second prism 30 so that the light is deflected upwardly through the aperture 31 in drum 27 with the image being formed just below the exit face of prism 30. The aperture 31 permits only a portion of the image to pass. The light passing through the aperture is directed into the photoelectric device 31 where the light is converted into electrical signals. The electrical signals are amplified to the level required by the recorder in the amplifier 37. The amplified electrical signals are impressed on stylus 23 causing that stylus to mark the chart in accordance with the output from the amplifier. Both the drum 27 and the recording arm 22 are driven in synchronism by the motor 14. Since the drum 27 is rotating at high speed, it is dynamically balanced, and for that purpose counterweights 56 are distributed about the drum's periphery wherever needed to eliminate any vibrations. The recording arm 22 is also dynamically balanced. In order to insure that slippage of belts 19 and 25 does not occur, as any slippage would disturb the necessary synchronism of drum 27 with recording arm 22, the belts 19 and 25 preferably have teeth which engage with teeth or recesses in their associated pulleys. Such belts and pulleys are conventionally used where precise timing is desired. In lieu of the pulley and belt arrangement, one may substitute a gear train, this latter expedient being somewhat more expensive, however.

The chart 41 is moved at a speed proportioned to ship's speed and radar range setting so that moving objects cause their tracks to be recorded on the chart while stationary objects will not present any tracks. Thus, the display of FIG. 3 when translated onto the chart 41 in FIG. 1 over a period of time, will show the buoy G as a stationary object 53, while the other ship H will draw a track as indicated by 54, and our own ship will draw a track down the middle of the chart as indicated by 55. Moreover, stationary objects will appear darker than moving objects because the stylus will fill in the location of the stationary object each time the rotating optical scan passes over its echo return image. An indication of the speed of moving objects can be obtained by the shading of the tracks drawn, slow moving objects causing dark tracks to be recorded and fast moving objects causing lighter tracks to appear on the chart.

A more precise measure of the speed of moving objects is obtained by providing the amplifier 37 with a timing circuit which interrupts the signals to the stylus for a short period after an interval of a specific duration. For example, the timing circuit may allow signals to pass to the stylus during a period of 10 minutes and then may interrupt the signals for a period of 1 minute. In consequence of the timing circuit's operation, moving objects draw a segmented track and by measuring the length of a segment the speed of the object can be determined. In FIG. 1, our own ship and the other ship H will draw segmented tracks in which the segments are of equal length because both vessels are moving at the same speed. If the other ship were moving at a faster speed, it would draw segments of longer length; were the other ship moving at a slower speed, segments of shorter length would be drawn.

The apparatus shown in FIG. 1 is housed in a console in order to exclude stray light sources from the optical scanning system and to prevent injury to personnel from the high speed rotating parts. The chart is visible through a transparent window so that the chart may be viewed while a record is being made.

The stylus 23, carried by the recording arm, intermittently passes over chart 41, at which times it is desired that the stylus contact the chart's surface. Since the recording arm rotates at high speeds, there is a possibility that the stylus may tear the chart if care is not taken to insure that the stylus does not gouge the surface of the chart upon initial contact between the two members. By tilting the shaft 21 at an angle of one or two degrees to the longitudinal axis 35 (FIG. 1), the stylus can be made to descend gradually upon the surface of the chart at each revolution of the recording arm.

The invention is not limited to the particular details of construction illustrated, as modifications which do not depart from the essence of the invention will be apparent to those skilled in the art. It is, therefore, intended that the scope of the invention be delimited by the appended claims.

What is claimed is:

1. An automatic recorder comprising a cathode ray tube, an optical system having means for scanning the face of said tube to receive light therefrom, said optical system being mounted for rotation on a carrier, said carrier being rotatably supported on a first shaft, a recording arm being rotatably supported on a second shaft and carrying a stylus, means for causing said carrier and said recording arm to rotate in synchronism about a common longitudinal axis, means for causing said axis to rotate about the periphery of said tube, a photoelectric device mounted adjacent said optical system for converting variations in light intensity into electrical signals, said optical system directing light from the scanned face of said tube into said photoelectric device, and means coupling signals from said photoelectric device to said stylus.

2. An automatic recorder comprising a cathode ray tube, an optical system having means for scanning the face of said tube to receive light therefrom, a carrier in which said optical system is mounted, said carrier being rotatably supported on a first shaft, a recording arm being rotatably supported on a second shaft and carrying a stylus, means for causing said carrier and said recording arm to rotate in synchronism about coincident axes, means for causing said axes to simultaneously rotate about the periphery of said tube, a photoelectric device mounted adjacent said optical system for converting variations in light intensity into electrical signals, said optical system directing light from the scanned face of said tube into said photoelectric device, means impressing the electrical signals from said device upon said stylus, a chart over which said stylus passes, and means for causing said chart to move at a selected rate of speed.

3. An automatic recorder comprising a cathode ray tube, an optical system having means for scanning the face of said tube to receive light therefrom, a drum on which said optical system is mounted, a recording arm carrying a stylus, means for causing said drum and said recording arm to rotate in synchronism about shafts having a common longitudinal axis, means for causing said shafts to be translated whereby said common axis revolves about the periphery of said tube, a photoelectric device for converting light intensity into electrical signals, means mounting said photoelectric device over the center of rotation of said drum, said optical system causing light from the scanned face of said tube to be directed into said device, means impressing electrical signals from said photoelectric device upon said stylus, a chart, said chart being positioned to be swept by said stylus, and means for causing said chart to move at a selected rate of speed.

4. An automatic recorder comprising a cathode ray tube, a hollow shaft disposed below the center of said tube and in longitudinal alignment therewith, a support, said shaft being mounted for rotation in said support, a table secured to one end of said shaft, a crank secured to the other end of said shaft, means for causing said shaft to rotate, a motor mounted on said crank, an arbor extending through said hollow shaft, means interconnecting said arbor and the shaft of said motor whereby said motor causes said arbor to rotate, a spindle mounted for rotation on said table, said spindle and the shaft of said motor being longitudinally aligned, a drum secured on said spindle, an optical system mounted in said drum, said optical system including means for scanning the face of said tube to receive light therefrom, a photoelectric device carried by said table, said optical system being arranged to direct light into said photoelectric device, a recording arm carrying a stylus, said recording arm being secured to the shaft of said motor, and means for impressing electrical signals derived from said photoelectric device upon said stylus.

5. An automatic recorder as defined in claim 4 and comprising means interconnecting said spindle and said arbor to cause said recording arm and said drum to rotate in synchronism, a chart positioned to be swept by said stylus, said chart being sensitized to the passage of electrical currents, and means for causing said chart to move at a selected rate of speed.

6. An automatic recorder comprising means for storing light energy, an optical system having means for scanning the face of said storing means to receive light therefrom, said optical system being mounted for rotation on a carrier, said carrier being rotatably supported on a first shaft, a recording arm being rotatably supported on a second shaft and carrying a stylus, means for causing said carrier and said recording arm to rotate in synchronism about a common longitudinal axis, means for causing said axis to rotate about the periphery of said storing means, a photoelectric device mounted adjacent said optical system for converting variations in light intensity into electrical signals, said optical system directing light from the scanned face of said storing means into said photoelectric device, and means coupling signals from said photoelectric device to said stylus.

References Cited in the file of this patent

UNITED STATES PATENTS

| | | |
|---|---|---|
| 2,412,669 | Bedford | Dec. 17, 1946 |
| 2,430,283 | Epstein | Nov. 4, 1947 |
| 2,759,783 | Ross | Aug. 21, 1956 |
| 2,825,884 | Fryklund | Mar. 4, 1958 |
| 2,872,273 | Stamper | Feb. 3, 1959 |
| 2,940,074 | Watt | June 7, 1960 |

UNITED STATES PATENT OFFICE
CERTIFICATE OF CORRECTION

Patent No. 2,992,059

July 11, 1961

Robert A. Fryklund

It is hereby certified that error appears in the above numbered patent requiring correction and that the said Letters Patent should read as corrected below.

Column 3, line 18, for "at" read -- as --; line 23, for "azimuth" read -- azimuthal --.

Signed and sealed this 12th day of December 1961.

(SEAL)
Attest:

ERNEST W. SWIDER
Attesting Officer

DAVID L. LADD
Commissioner of Patents